United States Patent
Nakahara

(10) Patent No.: US 9,274,981 B2
(45) Date of Patent: Mar. 1, 2016

(54) FORMING APPARATUS AND PROCESSING METHOD TO REQUEST CONFIGURATION DATA FROM A MANAGEMENT APPARATUS IN PREDETERMINED TRANSITION STATE

(75) Inventor: Hidetaka Nakahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 13/490,720

(22) Filed: Jun. 7, 2012

(65) Prior Publication Data

US 2012/0327442 A1 Dec. 27, 2012

(30) Foreign Application Priority Data

Jun. 27, 2011 (JP) .................................. 2011-142310

(51) Int. Cl.
*G06F 13/12* (2006.01)
(52) U.S. Cl.
CPC ...................................... *G06F 13/12* (2013.01)
(58) Field of Classification Search
CPC ............. H04M 2201/3205; H04M 2201/3226; H04M 2201/3221; H04M 2201/3276; H04M 2201/3207; H04M 2201/3208; H04M 2201/3274; H04M 1/00244; H04M 1/00482; G06F 3/1232; G06F 3/1238; G06F 3/1205; G06F 3/1257; G06F 3/1258; G06F 11/1402
See application file for complete search history.

(56) References Cited

U.S. PATENT DOCUMENTS

| | | | |
|---|---|---|---|
| 2001/0024295 A1* | 9/2001 | Tachibana et al. ........... | 358/1.15 |
| 2006/0170953 A1* | 8/2006 | Okamoto et al. ............ | 358/1.15 |
| 2006/0214881 A1 | 9/2006 | Kim et al. | |
| 2008/0263540 A1* | 10/2008 | Bando et al. ................. | 717/173 |
| 2009/0116052 A1* | 5/2009 | Matsuzawa .................. | 358/1.14 |
| 2010/0214588 A1* | 8/2010 | Nakahara ..................... | 358/1.13 |
| 2010/0241543 A1* | 9/2010 | Matsumoto ................... | 705/34 |
| 2011/0188080 A1* | 8/2011 | Chigusa ....................... | 358/1.15 |

FOREIGN PATENT DOCUMENTS

| | | |
|---|---|---|
| CN | 101064464 A | 10/2007 |
| JP | H09-163065 A | 6/1997 |
| JP | 2007-130838 A | 5/2007 |
| JP | 2009-033706 A | 2/2009 |
| JP | 2009-284183 A | 12/2009 |

OTHER PUBLICATIONS

English machine translation of JP Pub 2007-130838 to Denda Soji.*
Japanese Office Action issued in corresponding application No. 2011-142310 on Mar. 13, 2015.
Chinese Office Action issued in corresponding application No. 201210219008.8 on Mar. 10, 2015.

* cited by examiner

*Primary Examiner* — Benny Q Tieu
*Assistant Examiner* — Haris Sabah
(74) *Attorney, Agent, or Firm* — Carter, DeLuca, Farrell & Schmidt, LLP

(57) ABSTRACT

Upon generation of a prescribed condition in an image forming apparatus, when a download request of configuration data associated with that condition is sent to a configuration data management apparatus, the requested configuration data of those managed by the configuration data management apparatus are downloaded to the image forming apparatus. Then, the image forming apparatus uses the configuration data downloaded from the configuration data management apparatus as those associated with the condition.

11 Claims, 17 Drawing Sheets

FIG. 3
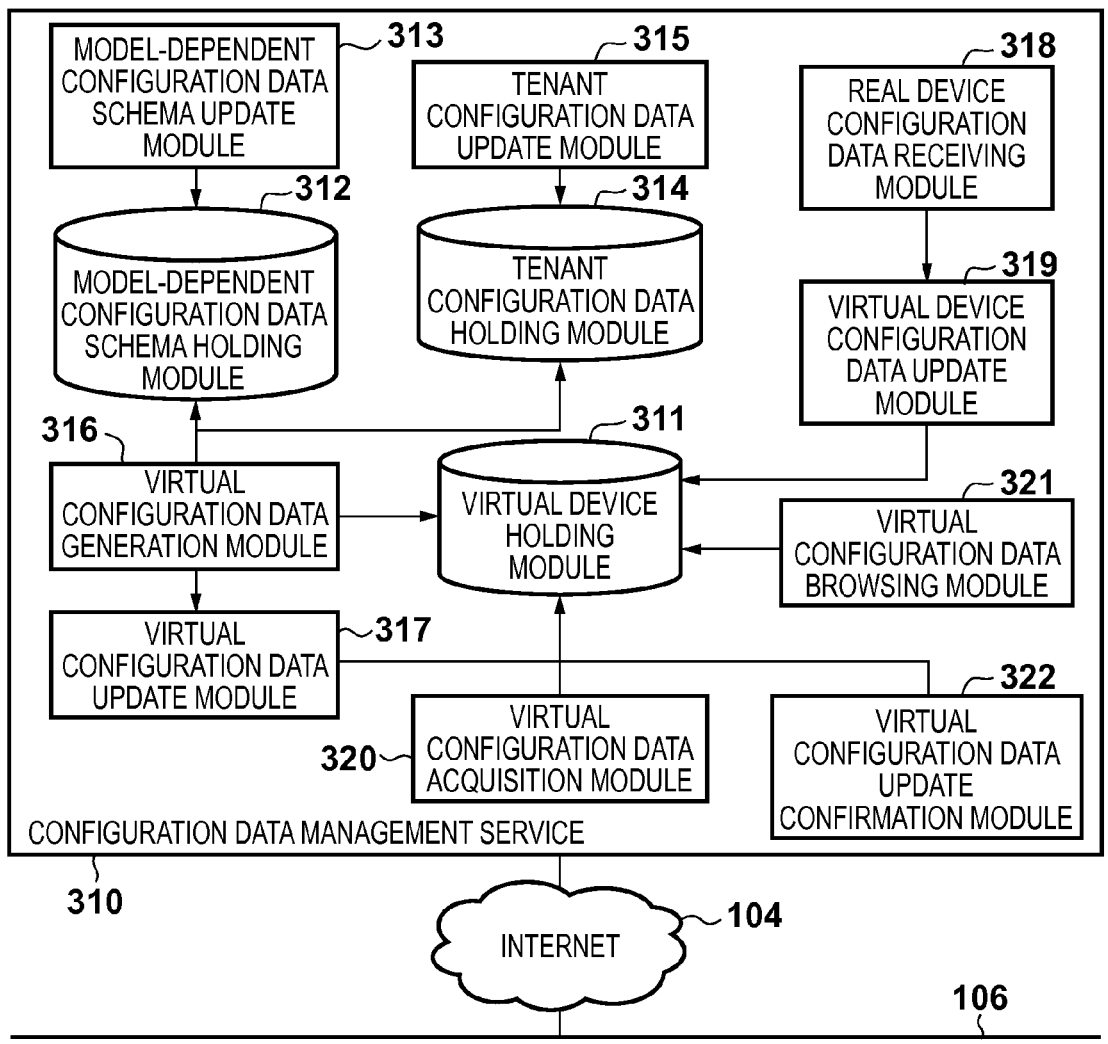
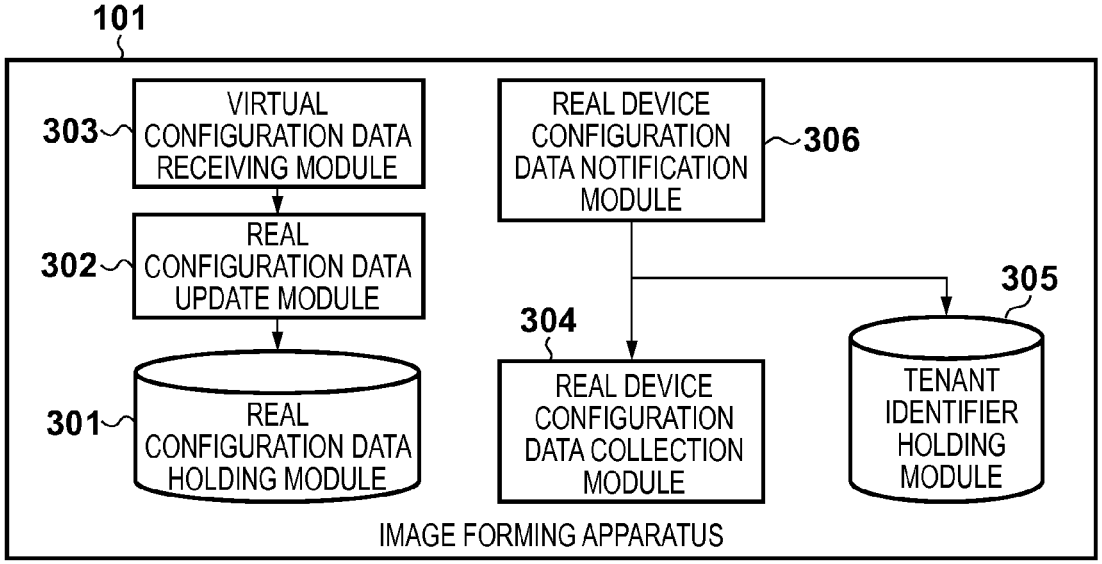

FIG. 4A

| CONFIGURATION DATA IDENTIFIER | DEFAULT VALUE | VALUE RANGE | CONDITION |
|---|---|---|---|
| copy_settings.nup | 1 in 1 | 1 in 1, 2 in 1, 4 in 1 | NONE |
| device_settings.cloud_address | "http://oanon.com/config" | 256 BYTES | NONE |
| device_settings.sleep_time | 10 MIN | 1 MIN, 10 MIN, 1 HOUR | NONE |
| fax_settings.received_print | OFF | ON, OFF | FAX UNIT |
| box_settings.server_address | " " | 256 BYTES | NONE |

FIG. 4B

| CONFIGURATION DATA IDENTIFIER | DEFAULT VALUE | VALUE RANGE | CONDITION |
|---|---|---|---|
| copy_settings.nup | 1 in 1 | 1 in 1, 2 in 1, 4 in 1 | NONE |
| device_settings.cloud_address | "http://oanon.com/config" | 256 BYTES | NONE |
| device_settings.sleep_time | 10 SEC | 10 SEC, 1 MIN, 10 MIN, 1 HOUR | NONE |
| fax_settings.received_print | OFF | ON, OFF | FAX UNIT |

FIG. 5

| CONFIGURATION DATA IDENTIFIER | VALUE |
|---|---|
| copy_settings.nup | 2 in 1 |
| device_settings.cloud_address | "http://oanon.com/config" |
| device_settings.sleep_time | 10 SEC |
| fax_settings.received_print | ON |
| box_settings.server_address | "http://192.168.1.1/server/" |

FIG. 6A

| DATA TYPE | VALUE |
|---|---|
| MODEL CODE | 0x01 |
| FIRMWARE VERSION | 00.01 |
| DEVICE IDENTIFIER | 010001 |
| FAX UNIT | NOT AVAILABLE |

FIG. 6B

| DATA TYPE | VALUE |
|---|---|
| MODEL CODE | 0x01 |
| FIRMWARE VERSION | 00.01 |
| DEVICE IDENTIFIER | 010002 |
| FAX UNIT | AVAILABLE |

FIG. 6C

| DATA TYPE | VALUE |
|---|---|
| MODEL CODE | 0x02 |
| FIRMWARE VERSION | 01.00 |
| DEVICE IDENTIFIER | 020001 |
| FAX UNIT | AVAILABLE |

FIG. 7A

| CONFIGURATION DATA IDENTIFIER | VALUE |
|---|---|
| copy_settings.nup | 2 in 1 |
| device_settings.cloud_address | "http://oanon.com/config" |
| device_settings.sleep_time | 10 MIN |
| fax_settings.received_print | OFF |
| box_settings.server_address | "http://192.168.1.1/config" |

FIG. 7B

| CONFIGURATION DATA IDENTIFIER | VALUE |
|---|---|
| copy_settings.nup | 2 in 1 |
| device_settings.cloud_address | "http://oanon.com/config" |
| device_settings.sleep_time | 10 MIN |
| fax_settings.received_print | ON |
| box_settings.server_address | "http://192.168.1.1/server/" |

FIG. 7C

| CONFIGURATION DATA IDENTIFIER | VALUE |
|---|---|
| copy_settings.nup | 2 in 1 |
| device_settings.cloud_address | "http://oanon.com/config" |
| device_settings.sleep_time | 10 SEC |
| fax_settings.received_print | ON |

FIG. 8

| DEVICE IDENTIFIER | TENANT IDENTIFIER | VIRTUAL DEVICE CONFIGURATION DATA | VIRTUAL CONFIGURATION DATA | NOTIFICATION FLAG |
|---|---|---|---|---|
| 010001 | 100 | 1 | 1 | NOT YET |
| 010002 | 100 | 2 | 2 | NOT YET |
| 020001 | 100 | 3 | 3 | DONE |
| 010010 | 200 | 4 | 4 | DONE |

FIG. 12

| LOAD CONDITION | LOAD TARGET |
|---|---|
| TRANSITION TO SERVICE MODE SCREEN | service_settings |
| TRANSITION TO USER MODE SCREEN | device_settings |
| RECEPTION OF PrintJob | pdl_settings |
| START OF SendJob | Send_settings |
| LOGIN | favorite_settings |

F I G. 14

| LOAD CONDITION | LOAD TARGET | CLUSTER USE TYPE | CLUSTER DISCARDING TIMING |
|---|---|---|---|
| TRANSITION TO SERVICE MODE SCREEN | service_settings | SYNC | — |
| TRANSITION TO USER MODE SCREEN | device_settings | SYNC | — |
| RECEPTION OF PrintJob | pdl_settings | ONE-TIME | JOB END TIMING |
| START OF SendJob | Send_settings | ONE-TIME | LOGOUT TIMING |
| LOGIN | favorite_settings | ONE-TIME | LOGOUT TIMING |

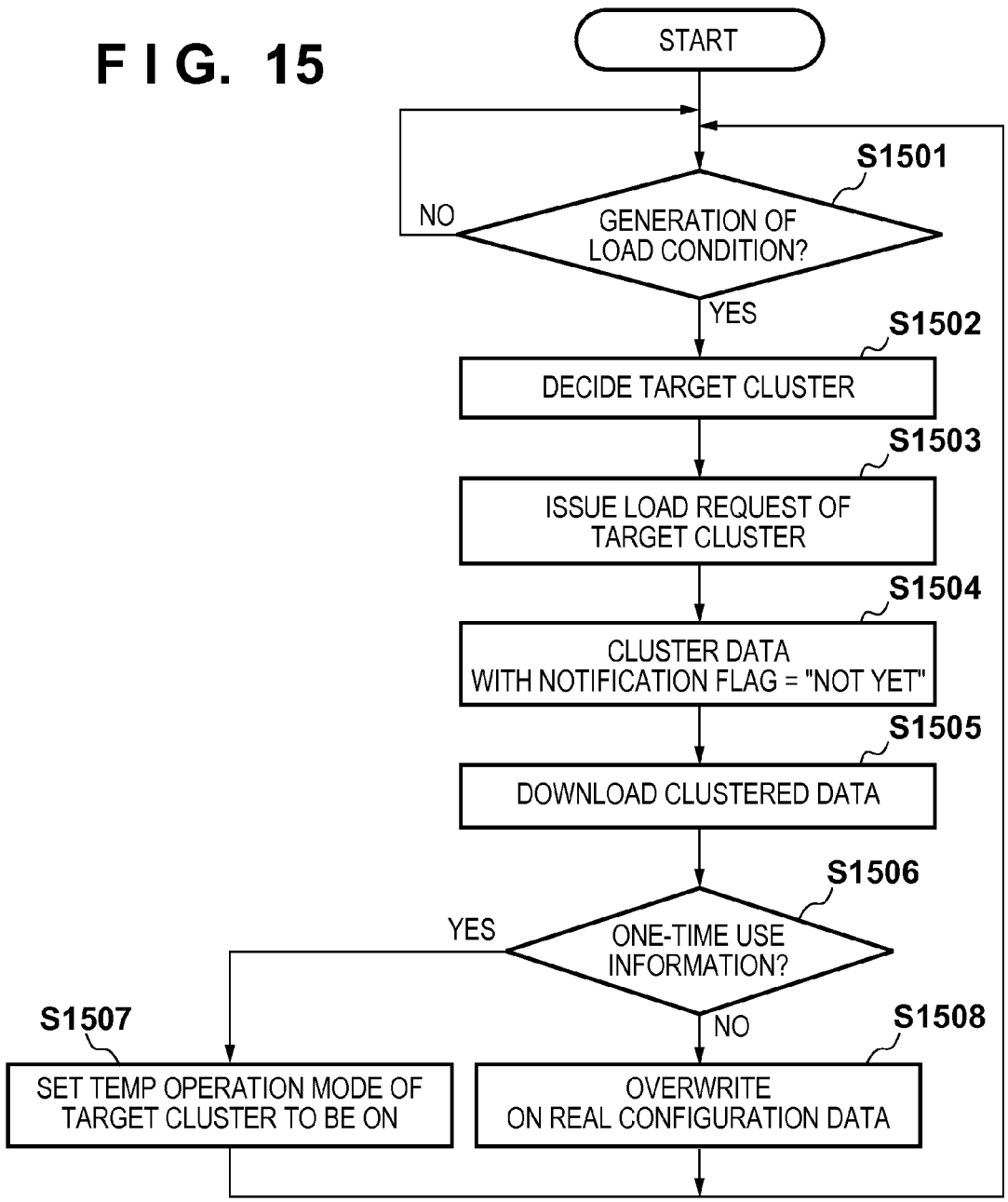
F I G. 15

FORMING APPARATUS AND PROCESSING METHOD TO REQUEST CONFIGURATION DATA FROM A MANAGEMENT APPARATUS IN PREDETERMINED TRANSITION STATE

BACKGROUND OF THE INVENTION

1. Field of the Invention

The present invention relates to an image forming apparatus for simultaneously managing configuration data required to switch operations of the image forming apparatus and a processing method therefor.

2. Description of the Related Art

Conventionally, an image forming apparatus which stores configuration data required to switch its operations is known. Since the configuration data is stored in a storage device included in each image forming apparatus, settings as many as the number of image forming apparatuses have to be made so as to change the configuration data of all the image forming apparatuses.

To save these steps, a technique for simultaneously setting configuration data of a plurality of image forming apparatuses from a given information processing apparatus is known. Also, a technique for allocating configuration data at a location where this data can be referred to via a network, and simultaneously managing the configuration data when a plurality of image forming apparatuses refer to the configuration data is available (Japanese Patent Laid-Open No. 2007-130838).

Also, upon referring to setting data via a network, in order to reduce the load on that processing, for example, a technique for synchronizing setting data at a pre-set time is available (Japanese Patent Laid-Open No. 2009-033706).

However, the above related art cannot be applied to configuration data, values of which are restricted under the influences of models of image forming apparatuses, hardware options included in the image forming apparatuses, and the like. Also, as for data synchronization, user's operations or jobs executed on a device may contend against the setting data synchronization processing.

SUMMARY OF THE INVENTION

The present invention provides an apparatus and method, which can provide an optimal data synchronization mechanism based on user's operations and device states.

According to one aspect of the present invention, there is provided an image forming apparatus, configuration data of which is managed by a configuration data management apparatus, comprising: a unit which requests the configuration data management apparatus to download configuration data associated with a prescribed condition when the prescribed condition is generated; and a unit to which the requested configuration data of the configuration data managed by the configuration data management apparatus are downloaded, and which uses the downloaded configuration data as the configuration data associated with the condition.

According to another aspect of the present invention, there is provided a processing method for an image forming apparatus, configuration data of which is managed by a configuration data management apparatus, the method comprising: requesting the configuration data management apparatus to download configuration data associated with a prescribed condition when the prescribed condition is generated; and using, when the requested configuration data of the configuration data managed by the configuration data management apparatus are downloaded, the downloaded configuration data as the configuration data associated with the condition.

Further features of the present invention will become apparent from the following description of exemplary embodiments (with reference to the attached drawings).

BRIEF DESCRIPTION OF THE DRAWINGS

FIG. 3 is a block diagram showing an example of the software arrangements of a configuration data management service and the image forming apparatus;

FIGS. 4A and 4B are tables showing examples of model-dependent configuration data schemata;

FIG. 5 is a table showing an example of tenant configuration data;

FIGS. 6A to 6C are tables showing examples of real device configuration data;

FIGS. 7A to 7C are tables showing examples of the configurations of a real configuration data holding module;

FIG. 8 is a table showing an example of the configuration of a virtual device holding module;

FIG. 12 shows the configuration of a load control table;

FIG. 14 shows the configuration of a load rule table according to another embodiment;

FIG. 15 is a flowchart executed upon downloading configuration data according to another embodiment;

DESCRIPTION OF THE EMBODIMENTS

Figure 1:
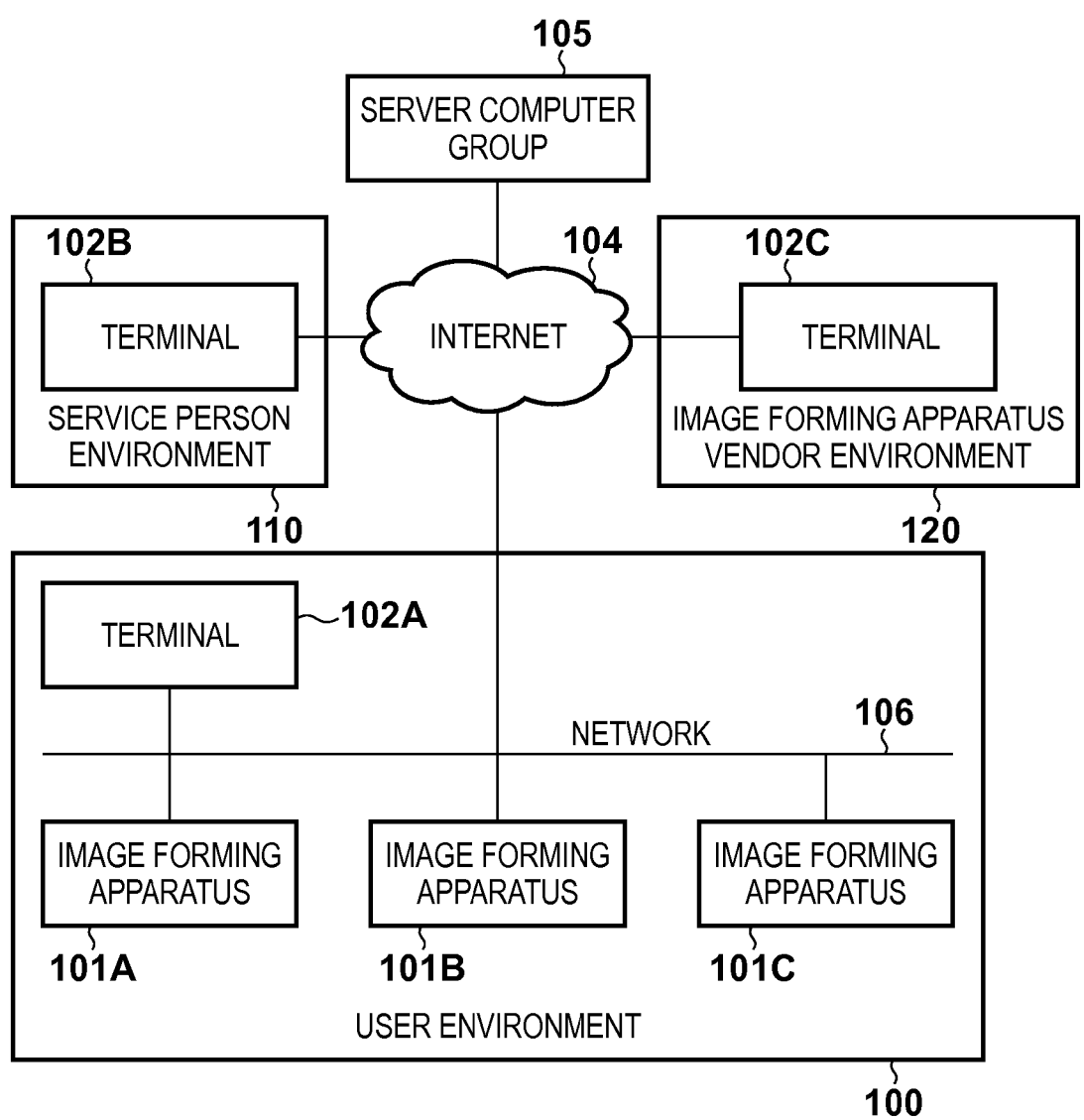
FIG. 1 is a block diagram showing an example of the network arrangement of a plurality of image forming apparatuses.

Embodiments of the present invention will be described in detail hereinafter with reference to the drawings.

Terms used in the following embodiments will be defined first. Configuration data is data required to switch operations of an image forming apparatus. For example, each configuration data corresponds to an imposition default value of a copy job. When this value is set to be "1 in 1", one page is printed per sheet as a result of a copy operation. When this value is set to be "2 in 1", two pages are printed per sheet as a result of a copy operation.

Device configuration data is that which indicates the configuration of devices included in an image forming apparatus. For example, the device configuration data corresponds to data which represents whether or not a FAX unit is equipped. Furthermore, the device configuration data includes a model code used to uniquely identify a model of an image forming apparatus, a version of active firmware, and the like.

A model-dependent configuration data schema is data which defines a schema of configuration data held by an image forming apparatus of a specific model. Note that the schema is data which defines agreements and positioning of configuration data. For example, the model-dependent configuration data schema includes a configuration data identifier, default value, value range, and condition required to validate data of each configuration data. Note that configuration data to be held has differences depending on models to be premised on management in which configuration data schemata are prepared for respective models.

A virtual device is a data group of a real device held by a server computer group. More specifically, the virtual device includes at least device configuration data and configuration data.

A tenant is a unit of a consigner to whom the user consigns management of an image forming apparatus. A tenant identifier is an identifier used to uniquely identify a tenant. For example, assume that a certain company consigns management of three image forming apparatuses in a user environment to a tenant. In this case, one tenant identifier corresponding to the user environment is assigned, and the three image forming apparatuses are recognized as those which belong to that tenant and are simultaneously managed.

In this case, in order to distinguish data included in a virtual device, data held by a real device, and tenant-dedicated data from each other, the following definitions will be given. Device configuration data included in a virtual device will be referred to as virtual device configuration data, and configuration data of the virtual device will be referred to as virtual configuration data. Device configuration data held by a real device will be referred to as real device configuration data, and configuration data of the real device will be referred to as real configuration data. Configuration data to be commonly used in a tenant will be referred to as tenant configuration data. Note that terms will be explained as needed in addition to the above description.

An example of the network arrangement of a plurality of image forming apparatuses will be described below with reference to FIG. 1. Image forming apparatuses 101 (101A to 101C) are simultaneously managed by a configuration data management service 310 (to be described in detail later), and can access an Internet 104 via a network 106.

A terminal 102A is a computer which can be operated by the user in a user environment 100, and can access the Internet 104 via the network 106. A terminal 102B is a computer which can be operated by a serviceperson who manages the image forming apparatuses 101, and can access the Internet 104. Furthermore, a terminal 102C is a computer which can be operated by an administrator who belongs to a vendor of the image forming apparatuses 101, and can access the Internet 104. The Internet 104 is a computer network, is mutually connected using the Internet protocol technique.

A server computer group 105 is a server group, which provides a plurality of services via the Internet 104. The network 106 allows digital communications in the user environment 100. A serviceperson environment 110 is an environment in which a serviceperson manages the image forming apparatuses using the terminal 102B. An image forming apparatus vendor environment 120 is an environment in which the administrator of the vendor who manufactures image forming apparatuses maintains data required to manage the image forming apparatuses using the terminal 102C.

An example of the hardware arrangements of the image forming apparatus 101, terminal 102, and server computer group 105 will be described below with reference to FIG. 2. A CPU 211 of the image forming apparatus 101 executes programs, and controls various processes. A nonvolatile memory 212 includes a ROM, and stores programs, data, and the like, which are required in an initial stage in device activation processing. A volatile memory 213 includes a RAM, and is used as a temporary storage location of programs and data. An auxiliary storage device 214 includes a large-capacity storage device such as a hard disk or RAM drive, saves large-capacity data, and holds execution codes of programs. The auxiliary storage device 214 stores data which are required to be held for a longer period of time than the volatile memory 213. The auxiliary storage device 214 is a nonvolatile storage device, and can keep storing data even after power-OFF.

A display 215 is a device which informs a user of information. Note that the user includes the user and serviceperson. An input device 216 is a device which accepts a selection instruction from the user, and transfers the instruction to a program via an internal bus 210. A network communication device 217 is a device required to communicate with another information processing apparatus via a network. A FAX unit 218 is a hardware unit required to send image data formed by the image forming apparatus 101 or that stored in the auxiliary storage device to another information device via the network 106. The FAX unit 218 is an option, and may not be equipped depending on models.

A printer engine 219 has a function of printing, on a paper medium, image data formed by the image forming apparatus 101 or that stored in the auxiliary storage device. The internal bus 210 is a communication bus, which connects the CPU 211, nonvolatile memory 212, volatile memory 213, auxiliary storage device 214, display 215, input device 216, and network communication device 217 to be able to communicate with each other in the image forming apparatus 101.

The server computer group 105 includes a plurality of server computers 205 and 206 which are connected via a network 260. An internal bus 250 is a communication bus, which connects a CPU 251, nonvolatile memory 252, volatile memory 253, auxiliary storage device 254, and network communication device 257 included in the server computer 205 to be able to communicate with each other in the server computer 205. The network 260 is a network which allows high-speed communications between the server computers included in the server computer group 105.

Note that the hardware arrangement of the terminal 102 is that obtained by excluding the FAX unit 218 and printer engine 219 from that of the image forming apparatus 101, and a description thereof will not be given.

An example of the software arrangements of the configuration data management service 310 which is executed by one server computer of the server computer group 105, and the image forming apparatus 101 will be described below with reference to FIG. 3.

The software arrangement of the image forming apparatus 101 will be described first. A real configuration data holding module 301 holds configuration data of the image forming apparatus 101 in the auxiliary storage device 214, and the image forming apparatus 101 switches operation behaviors based on the held real configuration data. A real configuration data update module 302 updates real configuration data held by the real configuration data holding module 301. The real configuration data is updated using virtual configuration data received by a virtual configuration data receiving module 303 (to be described later). The real configuration data is updated only under a condition that virtual configuration data has been updated by a virtual configuration data update confirmation module 322 (to be described later).

The virtual configuration data receiving module 303 calls a virtual configuration data acquisition module 320 (to be described later) to receive virtual configuration data. An address used to call the virtual configuration data acquisition module 320 uses that held in the real configuration data holding module 301. More specifically, taking FIG. 7A as an example, an address "http://canon.com/config", a configuration data identifier 702 of which assumes a value 703 "device_settings.cloud_address" is accessed.

A real device configuration data collection module 304 collects device configuration data of the image forming apparatus 101. FIGS. 6A to 6C show examples of real device configuration data 601A to 601C. Values 603 are respectively stored in data types 602. The data types 602 include a model code required to identify a model, a firmware version, a device identifier required to identify a device, and the presence/absence of a FAX unit.

A tenant identifier holding module 305 stores a tenant identifier to which the image forming apparatus 101 belongs. This tenant identifier is set at the time of initial installation of the image forming apparatus 101, and is stored in the auxiliary storage device 214 so as not to be lost even after power-OFF. A real device configuration data notification module 306 notifies the real device configuration data collected by the real device configuration data collection module 304 and the tenant identifier stored in the tenant identifier holding module 305. A notification destination is a real device configuration data receiving module 318 (to be described later).

Next, the software arrangement of the configuration data management service 310 will be described below. The configuration data management service 310 provides a function of simultaneously managing configuration data of the plurality of image forming apparatuses 101A to 101C. This configuration data management service 310 is provided on the aforementioned server computer group 105, and holds a plurality of modules. The respective modules will be described below.

A virtual device holding module 311 stores data held by virtual devices. FIG. 8 shows an example of virtual devices stored in the virtual device holding module 311. A virtual device list 801 corresponds to whole virtual devices held by the virtual device holding module 311.

A device identifier 802 is used to specify one of virtual devices in the virtual device list 801. The device identifier 802 is originally stored in the image forming apparatus 101, and allows to uniquely identify the image forming apparatus 101. This identifier is notified from the image forming apparatus 101 as one of device configuration data.

A tenant identifier 803 is used to identify a tenant to which the image forming apparatus 101 corresponding to a virtual device belongs. Virtual device configuration data 804 is device configuration data of the image forming apparatus 101 corresponding to a virtual device. As the virtual device configuration data, pieces of information shown in FIGS. 6A to 6C are separately held by the virtual device holding module 311. The virtual device configuration data 804 holds an identifier used as a link to FIGS. 6A to 6C.

Virtual configuration data 805 is that to be referred to by the image forming apparatus 101 corresponding to a virtual device. As the virtual configuration data, pieces of information shown in FIGS. 7A to 7C are separately held by the virtual device holding unit 311. The virtual configuration data 805 holds an identifier used as a link to FIGS. 7A to 7C.

A notification flag 806 indicates whether or not to send a notification to the image forming apparatus 101 after the virtual configuration data is updated. When a virtual configuration data acquisition module 320 refers to corresponding virtual configuration data, "done" is stored. When a virtual configuration data update module 317 updates corresponding virtual configuration data, "not yet" is stored.

A model-dependent configuration data schema holding module 312 stores model-dependent configuration data schemata. One model-dependent configuration data schema is prepared in correspondence with each model of the image forming apparatus 101. FIGS. 4A and 4B show examples of model-dependent configuration data schemata. FIG. 4A shows an example of a model-dependent configuration data schema 401A with a model code=0x01. FIG. 4B shows an example of a model-dependent configuration data schema 401B with a model code=0x02.

A configuration data identifier 402 is used to uniquely identify a configuration data. In this case, "copy_settings.nup" indicates a setting associated with imposition of copy settings. When this configuration data identifier 402 is the same, it indicates a configuration data of the same type even for different models.

A default value 403 is a definition of a default configuration data in that model. A value range 404 is a definition of a range which can be set in that model.

The value range 404 of "copy_settings.nup" indicates that the user can select a value from three different values "1 in 1, 2 in 1, 4 in 1".

A condition 405 is a definition of a condition required to use the configuration data in that model. Since the condition 405 of "fax_settings.received_print" includes "FAX unit", it indicates that this configuration data is valid only when attachment of a FAX unit can be confirmed.

A model-dependent configuration data schema update module 313 updates model-dependent configuration data schemata held by the model-dependent configuration data schema holding module 312. When an image forming apparatus vendor has announced a new model, a model-dependent configuration data schema corresponding to the new model is registered in accordance with an instruction of an administrator of the vendor. When configuration data has changed, a model-dependent configuration data schema is similarly updated.

A tenant configuration data holding module 314 holds configuration data to be set in the image forming apparatus 101 held by a tenant. FIG. 5 shows an example of tenant configuration data 501. A configuration data identifier 502 is equivalent to the configuration data identifier 402 in the model-dependent configuration data schema described using FIGS. 4A and 4B. A value 503 is common configuration data desired by this tenant. "2 in 1" is set for "copy_settings.nup". This indicates that the tenant desires to set "2 in 1" in all the held image forming apparatuses.

A tenant configuration data update module 315 updates the tenant configuration data held by the tenant configuration data holding module 314. A serviceperson who manages the image forming apparatuses held by the tenant updates the tenant configuration data. An update instruction is input from a setting screen displayed on a Web browser, which runs on the terminal 102B in the serviceperson environment 110.

A virtual configuration data generation module 316 generates virtual configuration data using the model-dependent configuration data schema, tenant configuration data, and virtual device configuration data. The processing contents of this module will be described below for respective steps.

The virtual configuration data generation module 316 acquires the virtual device configuration data from the virtual device holding module 311. The virtual configuration data generation module 316 refers to a model code included in the acquired virtual device configuration data to specify a model of the image forming apparatus. Taking FIG. 6A as an example, a model with a model code=0x01 is determined.

Next, the virtual configuration data generation module 316 acquires a model-dependent configuration data schema which matches the acquired model code from the model-dependent configuration data schema holding module 312. Taking FIG. 6A as an example, the schema 401A (FIG. 4A) which matches the model code=0x01 is acquired.

The virtual configuration data generation module 316 sets configuration data defined in the model-dependent configuration data schema as bases of virtual configuration data. Taking FIG. 4A as an example, the following five configuration data are set as bases:

"copy_settings.nup";
"device_settings.cloud_address";
"device_settings.sleep_time";
"fax_settings.received_print"; and
"box_settings.server_address".

The virtual configuration data generation module 316 then acquires values registered in the tenant configuration data, and determines whether or not the acquired values fall within value ranges defined in the model-dependent configuration data schema. Taking FIGS. 4A and 5 as an example, "copy_settings.nup" has a value "2 in 1", and the value range is "1 in 1, 2 in 1, 4 in 1", the value falls within the value range. However, since "device_settings.sleep_time" has a value "10 sec", and a value range is "1 min, 10 min, 1 hour", that value does not fall within the value range. When the value does not fall within the value range, a default value defined in the model-dependent configuration data schema is acquired. In this example, a default value "10 min" is acquired.

It is determined whether or not conditions defined in the model-dependent configuration data schema are satisfied. This determination is made using the device configuration data. Taking FIG. 6A as an example, since a condition of "copy_settings.nup" is not particularly specified, it is satisfied. However, since a condition of "fax_settings.received_print" is "FAX unit", and the device configuration data is "not available", the condition is not satisfied. When the conditions are satisfied, values decided in steps described so far are used. On the other hand, when the condition is not satisfied, a default value 403 defined in the model-dependent configuration data schema is acquired. In this example, "OFF" is acquired.

Values decided in the aforementioned steps correspond to virtual configuration data. FIGS. 7A to 7C show examples of the virtual configuration data. FIG. 7A shows virtual configuration data 701A corresponding to an image forming apparatus with a device identifier =010001. Also, FIG. 7B shows virtual configuration data 701B corresponding to an image forming apparatus with a device identifier=010002. Furthermore, FIG. 7C virtual configuration data 701C corresponding to an image forming apparatus with a device identifier=020001.

The virtual configuration data update module 317 registers the virtual configuration data generated by the virtual configuration data generation module 316 in the virtual device holding module 311. The virtual configuration data update module 317 searches virtual devices held by the virtual device holding module 311 for a virtual device whose device identifier matches, and updates the virtual configuration data. Furthermore, when the notification flag 806 of that virtual device is "done", the virtual configuration data update module 317 sets "not yet" in that flag. This indicates that the virtual configuration data has been changed, and the image forming apparatus has to refer to new virtual configuration data.

A real device configuration data receiving module 318 receives a notification from the real device configuration data notification module 306. Notified information includes the device configuration data shown in FIGS. 6A to 6C and the tenant identifier. A virtual device configuration data update module 319 registers the device configuration data received by the real device configuration data receiving module 318 in a corresponding virtual device as virtual device configuration data. The virtual device configuration data update module 319 searches virtual devices held by the virtual device holding module 311 for a virtual device whose device identifier matches, and updates its virtual device configuration data.

A virtual configuration data acquisition module 320 receives a request from the image forming apparatus 101 via the Internet 104, and acquires virtual configuration data. In this case, the request includes at least a device identifier used to specify a virtual device, and the virtual configuration data acquisition module 320 searches for a virtual device whose device identifier matches. The virtual configuration data acquisition module 320 searches for virtual configuration data held by the found virtual device, and passes the virtual configuration data to a request source.

A virtual configuration data browsing module 321 receives a request via the Internet 104, and browses virtual configuration data. The request is that on an HTTP protocol, and virtual configuration data is browsed on an HTML page generated by the virtual configuration data browsing module 321.

A virtual configuration data update confirmation module 322 confirms whether or not virtual configuration data has been updated. The virtual configuration data receiving module 303 transmits a device identifier to the virtual configuration data update confirmation module 322 via the Internet 104. The virtual configuration data update confirmation module 322 searches virtual devices held by the virtual device holding module 311 for a virtual device which matches the received device identifier. If the notification flag 806 of the found virtual device is "not yet", the virtual configuration data update confirmation module 322 determines that the virtual configuration data has been updated. Conversely, if the notification flag 806 is "done", the module 322 determines that the virtual configuration data has not been updated.

Figure 9:
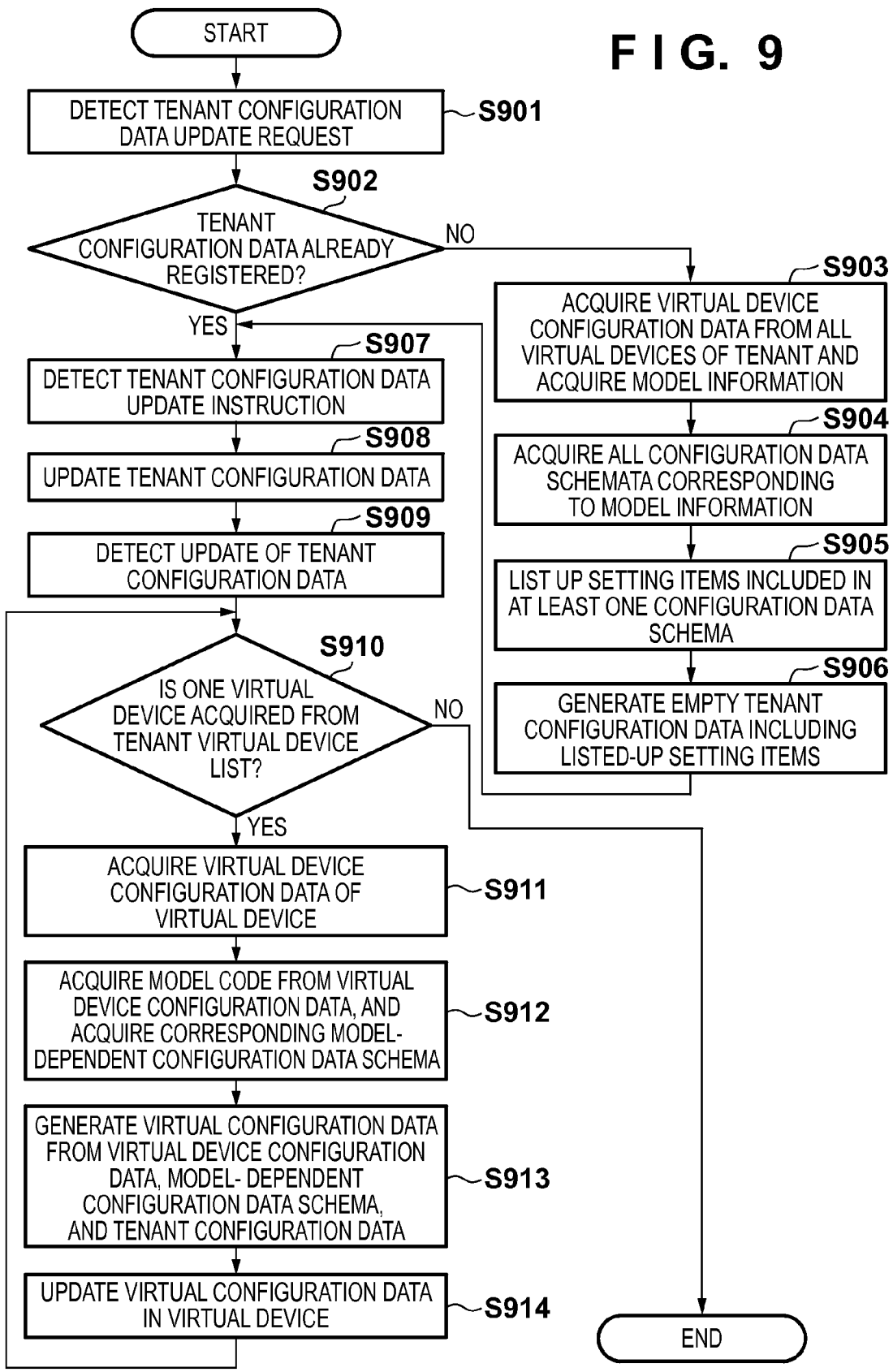
FIG. 9 is a flowchart showing update processing of tenant configuration data.

FIG. 9 is a flowchart for explaining processing for updating tenant configuration data by an administrator user using the terminal 102A. Respective modules which execute respective steps of the flowchart are stored in any storage unit of the nonvolatile memory 252, volatile memory 253, and auxiliary storage device 254, and are executed by the CPU 251.

In step S901, the tenant configuration data update module 315 detects an update request of tenant configuration data. The tenant configuration data update module 315 confirms in step S902 whether or not the tenant configuration data holding module 314 stores tenant configuration data corresponding to the update request in step S901. If that tenant configuration data is stored, the tenant configuration data update module 315 executes step S907; otherwise, it executes step S903.

In step S903, the tenant configuration data update module 315 searches the virtual device holding module 311 for a virtual device held by the tenant. In step S904, the tenant configuration data update module 315 refers to a model code included in virtual device configuration data of the virtual device found in step S903. Furthermore, the tenant configuration data update module 315 searches the model-dependent configuration data schema holding module 312 for model-dependent configuration data schemata which match the model code.

In step S905, the tenant configuration data update module 315 lists up settings included in at least one of the model-dependent configuration data schemata found in step S904. In step S906, the tenant configuration data update module 315 generates tenant configuration data having the settings listed up in step S905.

In step S907, the tenant configuration data update module 315 detects a practical update instruction of the tenant configuration data. In step S908, the tenant configuration data update module 315 updates the tenant configuration data held by the tenant configuration data holding module 314 based on the update instruction detected in step S907. Then, in step S909, the virtual configuration data generation module 316 detects update of the tenant configuration data.

In step S910, the virtual configuration data generation module 316 searches virtual devices held by the virtual device holding module 311 for virtual devices which match a tenant identifier of the tenant configuration data whose update is detected. In order to execute sequential processing for the found virtual devices, the virtual configuration data generation module 316 acquires one virtual device. After the virtual device is acquired, the virtual configuration data generation module 316 executes step S911. The sequential processing is executed for all virtual devices, and when a next virtual device cannot be acquired, the processing ends.

In step S911, the virtual configuration data generation module 316 acquires virtual device configuration data from the virtual device. In step S912, the virtual configuration data generation module 316 acquires a model code from the virtual device configuration data. Furthermore, the virtual configuration data generation module 316 searches model-dependent configuration data schemata held by the model-dependent configuration data schema holding module 312 for a model-dependent configuration data schema corresponding to the model code.

In step S913, the virtual configuration data generation module 316 generates virtual configuration data using the virtual device configuration data, model-dependent configuration data schema, and tenant configuration data. In step S914, the virtual configuration data update module 317 registers the virtual configuration data generated in step S913 in the virtual device.

Figure 10:
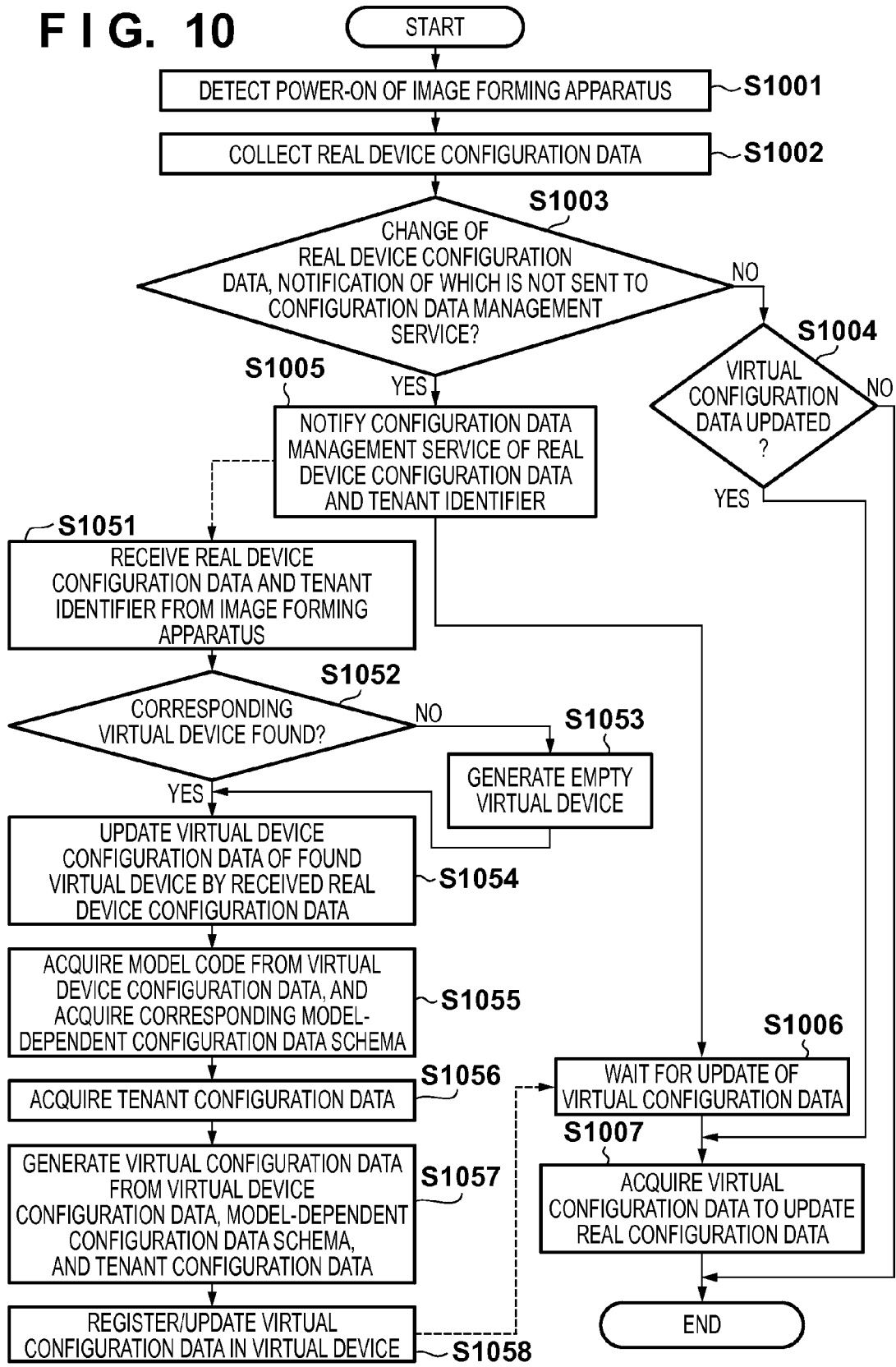
FIG. 10 is a flowchart showing acquisition processing of virtual configuration data.

FIG. 10 is a flowchart for explaining processing for acquiring virtual configuration data from the image forming apparatus. Steps S1001 to S1008 are those executed by the image forming apparatus. Respective modules which execute these steps are stored in any storage unit of the nonvolatile memory 212, volatile memory 213, and auxiliary storage device 214, and are executed by the CPU 211.

Steps S1051 to S1058 are those to be executed by the server computer group 105. Respective modules which execute these steps are stored in any storage unit of the nonvolatile memory 252, volatile memory 253, and auxiliary storage device 254, and are executed by the CPU 251.

In step S1001, the real device configuration data notification module 306 detects power-ON of the image forming apparatus. In step S1002, the real device configuration collection module 304 collects device configuration data. The real device configuration data notification module 306 determines in step S1003, using the real device configuration data collected in step S1002, whether or not there is a change of real configuration data, a notification of which is not sent to the configuration data management service 310. If such change is found, step S1005 is executed; otherwise, step S1004 is executed.

The virtual configuration data receiving module 303 determines in step S1004 whether or not a device has already acquired the latest virtual configuration data. The virtual configuration data receiving module 303 calls the virtual configuration data update confirmation module 322 to attain this determination step. In step S1005, the real device configuration data notification module 306 notifies the configuration data management service 310 of the real device configuration data and tenant identifier. The configuration data management service 310 side detects this in step S1051, and executes processing. Details of this processing will be described later.

In step S1006, the virtual configuration data receiving module 303 waits execution of processing until the update processing of virtual configuration data is complete. In step S1007, the virtual configuration data receiving module 303 receives the virtual configuration data from the configuration data management service 310. Furthermore, the real configuration data update module 302 updates the received virtual configuration data as real configuration data. The real configuration data is stored by the real configuration data holding module 301.

In step S1051, the real device configuration data receiving module 318 receives the real device configuration data and tenant identifier notified from the image forming apparatus. In step S1052, the virtual device configuration data update module 319 searches for a virtual device which matches the real device configuration data and tenant identifier received in step S1051. In this case, the module 319 searches virtual devices held by the virtual device holding module 311. In a case in which the image forming apparatus communicates with the configuration data management service 310 for the first time, a virtual device search may often fail. If a virtual device which matches the real device configuration data and tenant identifier is found, step S1054 is executed. If a virtual device which matches the real device configuration data and tenant identifier is not found, step S1053 is executed.

In step S1053, the virtual device configuration data update module 319 generates an empty virtual device. In step S1054, the virtual device configuration data update module 319 updates virtual device configuration data of the virtual device which is found in step S1052 or is generated in step S1053. The contents of the real device configuration data received in step S1051 correspond to new virtual device configuration data.

In step S1055, the virtual configuration data generation module 316 acquires a model code from the updated virtual device configuration data. Furthermore, the virtual configuration data generation module 316 acquires a model-dependent configuration data schema corresponding to the model code from the model-dependent configuration data schema holding module 312. In step S1056, the virtual configuration data generation module 316 acquires tenant configuration data. The module 316 searches tenant configuration data held by the tenant configuration data holding module 314 for tenant configuration data which matches the tenant identifier.

In step S1057, the virtual configuration data generation module 316 generates virtual configuration data. The virtual configuration data generation module 316 generates the virtual configuration data using the virtual device configuration data, model-dependent configuration data schema, and tenant configuration data. In step S1058, the virtual configuration data update module 317 registers the virtual configuration data generated in step S1057 in the corresponding virtual device.

Figure 11:
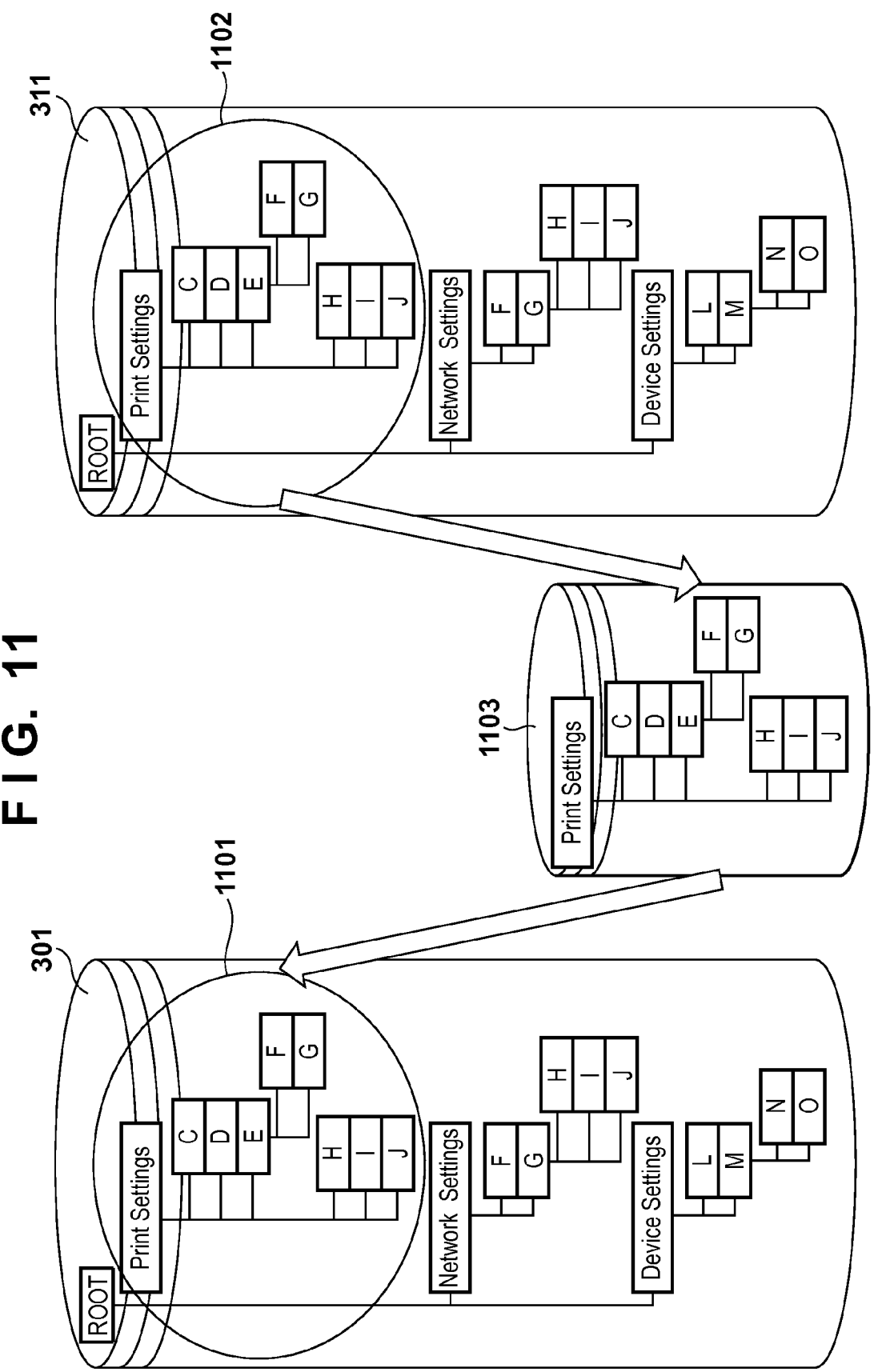
FIG. 11 is a view showing the structure of data to be downloaded.

Processing for downloading configuration data from the configuration data management service 310 of the server computer to the image forming apparatus 101 will be described below. The data structure of configuration data to be downloaded will be described below with reference to FIG. 11. As shown in FIG. 11, the virtual device holding module 311 of the configuration data management service 310 holds data in a hierarchically clustered state. This example shows a state having a tree structure as a hierarchical structure. Individual configuration data described using FIG. 5 is hierarchically prescribed for respective "significant clusters".

In fact, the image forming apparatus 101 which manages devices includes the real configuration data holding module 301 held as a database which is hierarchically managed in the same manner as the virtual device holding module 311. When configuration data has been updated in the virtual device holding module 311, the updated contents are also reflected to the real configuration data holding module 301 in the image forming apparatus 101.

Upon execution of this reflecting processing, synchronization of all data is more likely to result in deterioration in terms of performance. In order to avoid such deterioration, only required data have to be loaded at a required timing to execute data synchronization control.

FIG. 11 exemplifies an image in which only setting items associated with print settings are downloaded and synchronized. This cluster 1101 is a subset of configuration data groups held by the real configuration data holding module 301, and is a data cluster of print settings prescribed by an uppermost layer "print settings". As described above, a cluster 1102 having the same hierarchical structure as this cluster 1101 is held as a subset in the virtual device holding module 311.

When update processing for, for example, rewriting data in the virtual device holding module 311 has been executed, processing for reflecting the rewritten contents to the real configuration data holding module 301 of the image forming apparatus 101 is executed in synchronism with that update processing. More specifically, when the cluster 1102 is a download target, the virtual configuration data acquisition module 320 acquires the cluster 1102 from the virtual device holding module 311. Note that a load condition required to download configuration data held by the virtual device holding module 311 to the real configuration data holding module 301 will be further described later using FIG. 12.

In this case, configuration data including data whose notification flag 806 (FIG. 8) is "not yet" in the cluster 1102 are extracted as a load cluster 1103. Then, the virtual configuration data receiving module 303 receives the load cluster 1103 via the Internet 104, and saves it in the real configuration data holding module 301. Then, configuration data associated with the print settings can be synchronized between the configuration data management service 310 and image forming apparatus 101.

A method of deciding the load timing and load cluster will be described below with reference to FIG. 12. A load control table 1201 shown in FIG. 12 stores load rules which associate load conditions and load target clusters with each other. In this embodiment, it is indispensable for the table 1201 to include at least a load condition 1202 and load target 1203.

The load condition 1202 describes a state transition trigger in the image forming apparatus 101 in response to a status change such as a user's operation or job entry end. The load target 1203 is prescribed in association with the load condition 1202. This load target 1203 is the load cluster 1103 shown in FIG. 11.

According to the load control table 1201, for example, when a serviceperson makes an operation for entering a service mode screen, that event is used as a trigger for loading a load cluster "service_settings". Upon reception of a print job, that event is used as a trigger for loading a load cluster "pdl_settings". When the user logs in, that event is used as a trigger for loading a load cluster "favorite settings" as favorite settings of the user. In this manner, the table 1201 describes prescriptions of the state transitions and load clusters.

Figure 13:
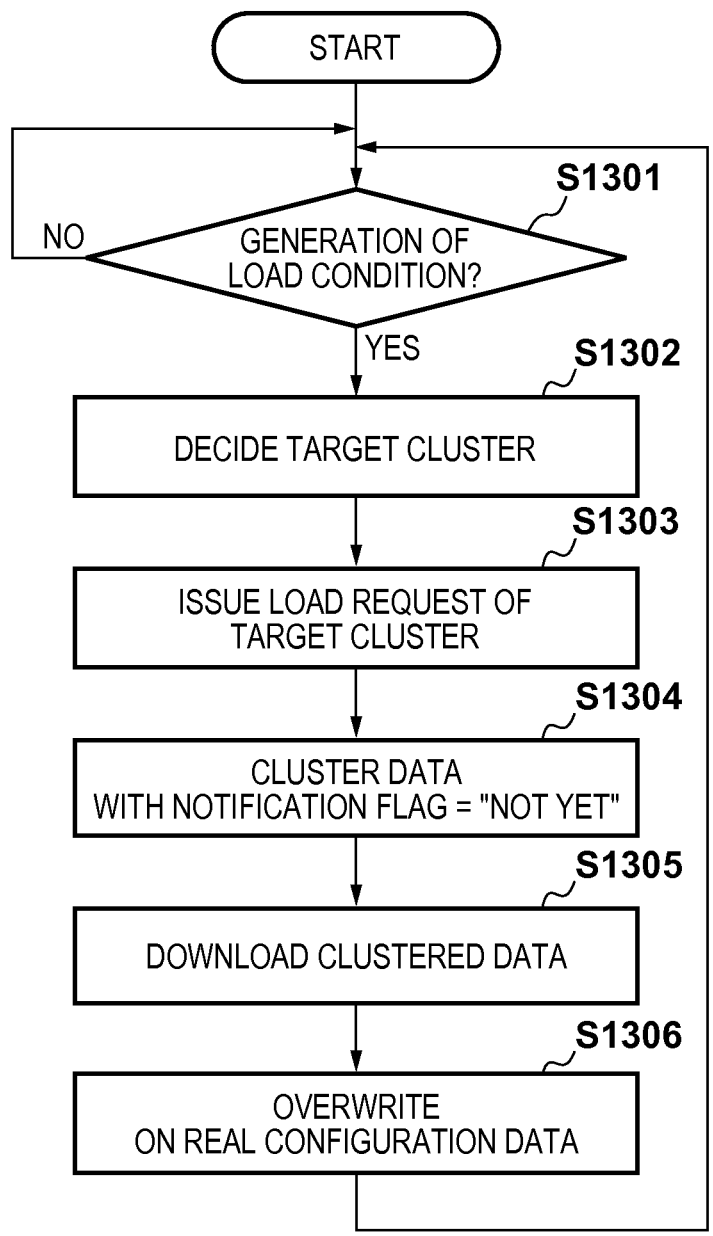
FIG. 13 is a flowchart showing processing for overwriting downloaded configuration data.

Processing for overwriting a load target cluster downloaded based on the load control table 1201 on the real configuration data holding module 301 upon generation of a load condition in the image forming apparatus 101 will be described below with reference to FIG. 13.

In step S1301, the virtual configuration data receiving module 303 of the image forming apparatus 101 monitors generation of the load condition 1202 prescribed in the load control table 1201. Upon detection of generation of the load condition 1202, the process advances to step S1302. In step S1302, the virtual configuration data receiving module 303 decides a cluster as the load target 1203 according to the load control table 1201.

In step S1303, the virtual configuration data receiving module 303 sends a load request of the decided cluster to the configuration data management service 310 side. In step S1304, the virtual configuration data acquisition module 320 on the configuration data management service 310 side clusters data whose notification flag is in a "not yet" state in the target cluster.

Note that in the example shown in FIG. 8, only one notification flag 806 is provided per virtual configuration data. Alternatively, the notification flag may be controlled for each cluster or item. When one notification flag is provided per virtual configuration data, the virtual configuration data acquisition module 320 updates the notification flag from "not yet" to "done" after all clusters are downloaded. When the notification flag is provided for each cluster, the virtual configuration data acquisition module 320 updates the notification flag from "not yet" to "done" when that cluster is downloaded. Also, the virtual configuration data acquisition module 320 updates the notification flag from "not yet" to "done" when that item is downloaded when the notification flag is provided for each item.

In step S1305, the virtual configuration data receiving module 303 receives the downloaded cluster from the virtual configuration data acquisition module 320. In step S1306, the real configuration data update module 302 overwrites that cluster on the real configuration data holding module 301, thus allowing the data in the cluster to be used as configuration data of the image forming apparatus 101.

As described above, minimum required configuration data can be received from the configuration data management service 310 and can be synchronized at a timing required for the user or device, thus providing optimal performance.

Note that the load control table 1201 itself shown in FIG. 12 is held in the nonvolatile memory 212 in the image forming apparatus 101, the nonvolatile memory 252 in the server computer 205, or the like, and is synchronized and reflected in the same manner as other configuration data.

Assume that the load control table 1201 is not held in the nonvolatile memory 212 in an initial state, and is held in only the virtual device holding module 311. Then, when the image forming apparatus 101 establishes first connection to the configuration data management service 310, it unconditionally downloads the load control table 1201, and saves it as a part of the real configuration data holding module 301. After that, the image forming apparatus 101 loads and synchronizes configuration data according to the load control table 1201. Load rules themselves of the load control table 1201 are described in the load control table itself, and can be updated according to the described rules. As a result, the load mechanism can be flexibly changed.

Another embodiment of the present invention will be described below. A basic system arrangement as another embodiment is the same as that of the aforementioned embodiment, except that another load rule table 1401 shown in FIG. 14 is used in place of the load control table 1201 shown in FIG. 12.

The load rule table 1401 includes a load condition 1402 and load target 1403 as in the load control table 1201. In addition, the table 1401 prescribes items of a cluster use type 1404 and cluster discarding timing 1405.

In the example shown in FIG. 14, the cluster use type 1404 shows pieces of information "sync" and "one-time". The information "sync" means that downloaded configuration data is synchronized, that is, overwritten on the real configuration data holding module 301 in the device when they are used as in the aforementioned embodiment. The information "one-time" indicates that downloaded configuration data is temporarily used without being synchronized with respect to the real configuration data holding module 301. In case of this "one-time", data to be discarded are discarded at a timing described in the cluster discarding timing 1405.

Figure 16:
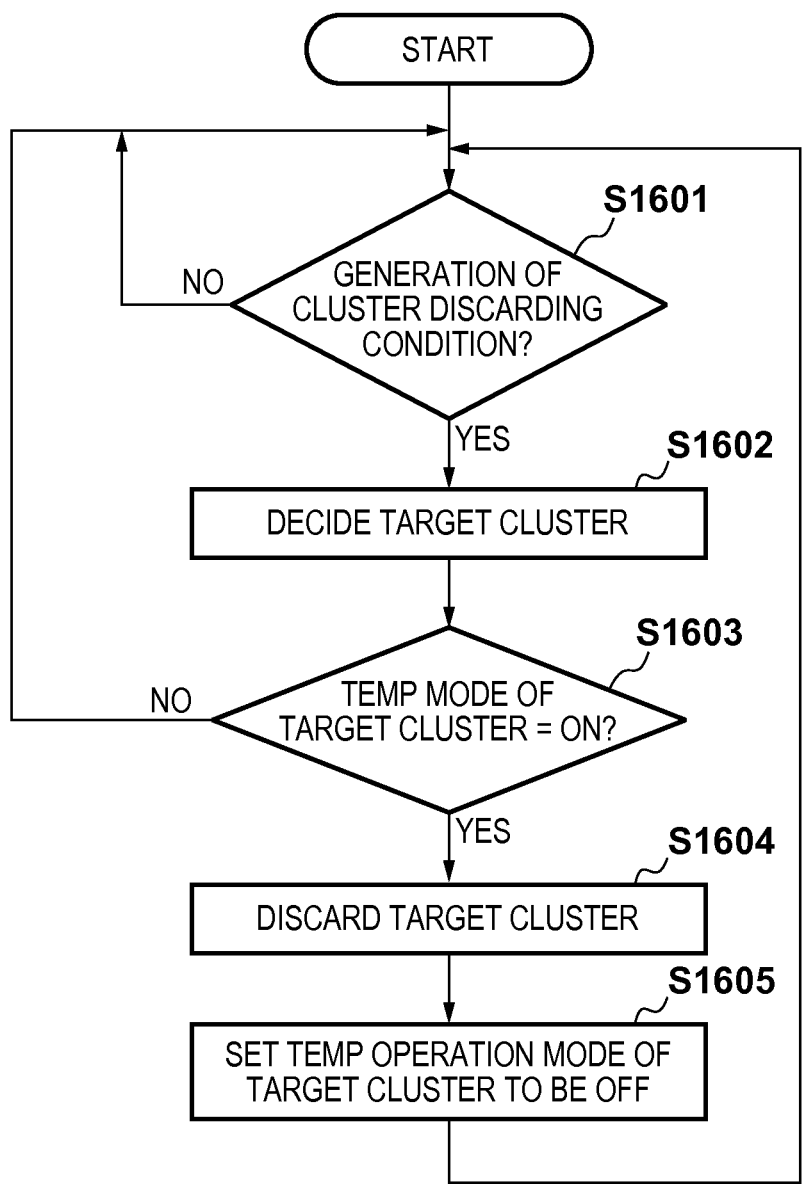
FIG. 16 is a flowchart showing processing associated with discarding of a one-time cluster.
Figure 17:
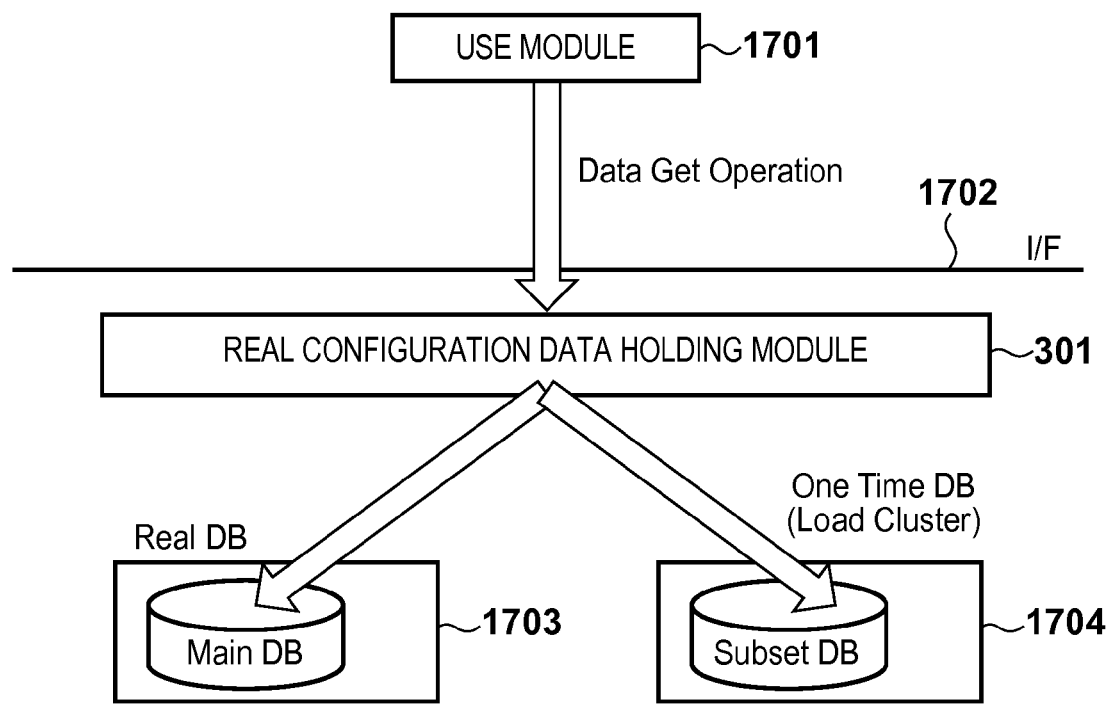
FIG. 17 is a diagram for explaining details of a Temp operation mode.

Processing at the time of this one-time use will be described below with reference to the flowcharts shown in FIGS. 15 and 16 and the module structure diagram shown in FIG. 17. FIG. 15 is a flowchart executed upon downloading configuration data according to another embodiment, and is executed in place of the flowchart shown in FIG. 13 in the aforementioned embodiment.

In step S1501, the virtual configuration data receiving module 303 of the image forming apparatus 101 monitors generation of the load condition shown in the load rule table 1401. Upon detection of generation of the load condition, the process advances to step S1502. In step S1502, the virtual configuration data receiving module 303 decides a load cluster according to the load rule table 1401.

In step S1503, the virtual configuration data receiving module 303 sends a load request of the target cluster to the configuration data management service 310 side. In step S1504, the virtual configuration data acquisition module 320 on the configuration data management service 310 side clusters data whose notification flag 806 is in a "not yet" state in the target cluster. Note that the notification flag 806 is the same as the aforementioned embodiment, and a description thereof will not be repeated.

In step S1505, the virtual configuration data receiving module 303 of the image forming apparatus 101 receives the downloaded cluster from the virtual configuration data acquisition module 320. In step S1506, the real configuration data update module 302 confirms the cluster use type 1404 of the target cluster based on the load rule table 1401. As a result of confirmation, if the cluster use type is "sync", the process advances to step S1508, and the real configuration data update module 302 overwrites the cluster as real configuration data.

On the other hand, as a result of confirmation, if the cluster use type 1404 of the target cluster is "one-time", the process advances to step S1507. In step S1507, the real configuration data update module 302 does not merge the cluster with the real configuration data, and sets a Temp operation mode to be ON. Details of this Temp operation mode will be further described later.

Processing associated with discarding of a one-time cluster will be described below with reference to the flowchart shown in FIG. 16. In step S1601, the real configuration data update module 302 of the image forming apparatus 101 monitors generation of a cluster discarding timing in the load rule table 1401. Upon detection of generation of the cluster discarding timing, the process advances to step S1602. In step S1602, the real configuration data update module 302 decides a cluster to be discarded according to the load rule table 1401.

In step S1603, the real configuration data update module 302 returns the process to step S1601 if the Temp operation mode for the target cluster is not ON. If the temp operation mode for the target cluster is ON, the process advances to step S1604, and the real configuration data update module 302 discards the target cluster itself. In step S1605, the real configuration data update module 302 resets the Temp operation mode of the target cluster to OFF.

Details of the aforementioned Temp operation mode will be described below with reference to FIG. 17. The real configuration data holding module 301 in the image forming apparatus 101 internally holds a Main DB 1703 as a single database in an initial state. Each configuration data use module 1701 in the image forming apparatus 101 acquires configuration data via an intra-device interface 1702 provided by the real configuration data holding module 301.

When the cluster use type 1404 in the aforementioned load rule table 1401 is "sync", the loaded setting data are merged in the Main DB 1703 when they are used. When the cluster use type 1404 is "one-time", the data are not merged in the Main DB 1703, and are held intact as a state of a Subset DB 1704, as described in the flowchart shown in FIG. 16. In this state, the real configuration data holding module 301 operates for this cluster while the Temp operation mode is ON.

When this Temp operation mode is ON, even when the Main DB 1703 includes target data, data are read out from the Subset DB 1704 and are referred to in response to an access from the configuration data use module 1701.

In this manner, the configuration data use module 1701 can similarly access data independently of whether the cluster use type 1404 is "one-time" or "sync". As shown in FIG. 17, information corresponding to "one-time" is discarded when its discarding timing is reached, and the control returns to an original state in which the values in the Main DB 1703 are to be referred to. After that, the configuration data use module 1701 refers to values originally included in the device.

Therefore, in, for example, a use case scene in which different settings are to be used for respective users, each user can use the image forming apparatus 101 in his or her desired setting state while keeping default settings of the image forming apparatus 101.

A modification of the embodiment according to the present invention will be described below. In the network shown in FIG. 1, assume that the configuration data management service 310 is executed by any of server computers in the server computer group 105. However, another arrangement may be adopted. For example, the server computer group may include only one server computer 205. Alternatively, the server computer group may be included in the user environment 100, serviceperson environment 110, image forming apparatus vendor environment 120, or the like.

In the network block diagram shown in FIG. 1, assume that the serviceperson uses the terminal 102B placed in the serviceperson environment 110. However, another arrangement may be adopted. For example, the serviceperson may use the terminal 102A placed in the user environment 100 under the user's permission.

Figure 2:
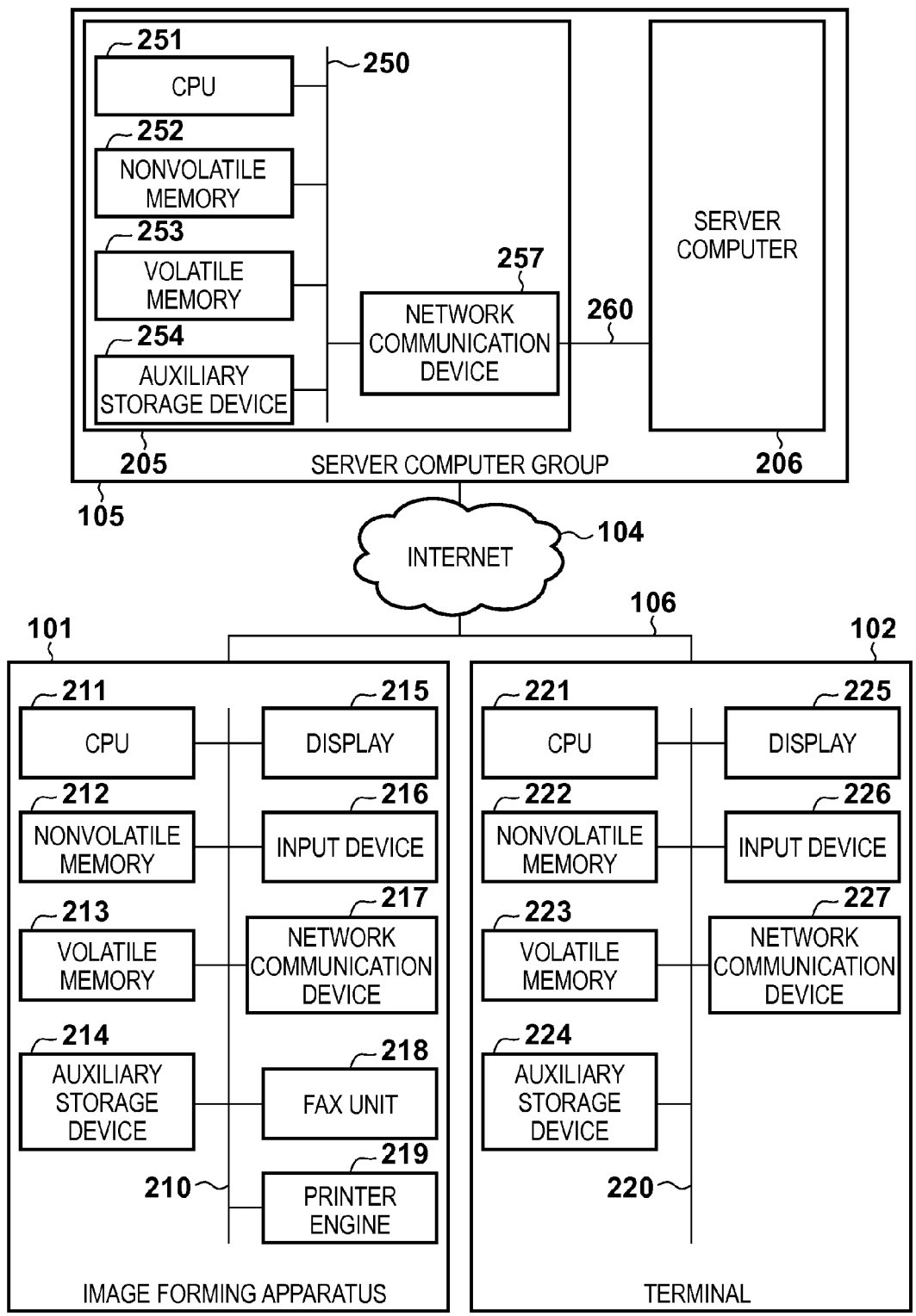
FIG. 2 is a block diagram showing an example of the hardware arrangements of respective apparatuses shown in FIG. 1.

In the hardware block diagram shown in FIG. 2, the server computer 205 and 206 communicate with each other via the network 260. However, another arrangement may be adopted. For example, these server computers may communicate with each other via the Internet 104.

In the software block diagram shown in FIG. 3, the real configuration data holding module 301 stores real configuration data in the auxiliary storage device 214. However, another arrangement may be adopted. For example, the volatile memory 213 may temporarily store the real configuration data. In this case, since the real configuration data is lost after power-OFF, the virtual configuration data receiving module 303 has to receive virtual configuration data every time the power supply of the device is turned on. In the practical processing sequence, the virtual configuration data update determination processing need not be executed in step S1004 in FIG. 10, and step S1007 is always executed.

In the software block diagram shown in FIG. 3, the real device configuration data collection module 304 collects real device configuration data every time the power supply of the image forming apparatus is turned on. However, another arrangement may be adopted. For example, a real device configuration data holding module may be included, and may always store real device configuration data in the auxiliary storage device 214. In this case, an arrangement for quickly rewriting real device configuration data held by the real device configuration data holding module in response to a change in real device configuration data is required. For this purpose, the real device configuration data collection module 304 has to monitor a change in real device configuration data, and update change contents in the real device configuration data holding module upon detection of the change contents. Furthermore, the real device configuration data notification module 306 requests the real device configuration data holding module to send real device configuration data.

In the software block diagram shown in FIG. 3, the tenant identifier holding module 305 stores tenant identifiers in the auxiliary storage device 214. However, another arrangement may be adopted. For example, the user may input the tenant identifier using the input device 216. The input timing may be an activation timing of the image forming apparatus or another timing. In this case, the tenant identifier is stored in the volatile memory 213.

In the software block diagram shown in FIG. 3, the real device configuration data notification module 306 executes processing by detecting power-ON of the image forming apparatus. However, another arrangement may be adopted. For example, the user may instruct to acquire virtual configuration data using the input device 216. In this case, by detecting a virtual configuration data acquisition instruction in step S1001 in FIG. 10, step S1002 and subsequent steps are executed.

In the software block diagram shown in FIG. 3, the virtual device holding module 311 holds virtual device configuration data and identifiers used to identify virtual configuration data, as shown in FIG. 8. However, another arrangement may be adopted. For example, data entities may be held in place of the identifiers.

In the software block diagram shown in FIG. 3, the virtual configuration data generation module 316 generates virtual configuration data from the model-dependent configuration data schema, tenant configuration data, and virtual device configuration data. However, another arrangement may be adopted. For example, virtual configuration data which fits a model may be generated from two data, that is, the model-dependent configuration data schema and tenant configuration data. In this case, the image forming apparatus refers to the real configuration data in correspondence with its device configuration.

As another example, virtual configuration data may be generated further using license data. In this case, the virtual configuration data is generated in correspondence with option functions included in the image forming apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-142310, filed Jun. 27, 2011, which is hereby incorporated by reference herein in its entirety.

What is claimed is:

1. An image forming apparatus comprising:
a unit that requests, if one of a plurality of load conditions is satisfied by the image forming apparatus, a cluster of configuration data from a management apparatus which manages configuration data of the image forming apparatus, the one of the plurality of load conditions being satisfied if a trigger of a predetermined state transition is occurred on the image forming apparatus;
a network communication device that receives from the management apparatus a cluster of configuration data of a plurality of clusters of configuration data managed by the management apparatus, the received cluster of configuration data being associated with the predetermined state transition of which trigger is occurred; and
an overwrite unit that updates configuration data of the image forming apparatus with the cluster of configuration data received by the network communication device, wherein the overwrite unit overwrites a corresponding cluster of configuration data of a plurality of clusters of configuration data of the image forming apparatus by overwriting with the received cluster of the configuration data, the overwritten configuration data being used as configuration data of the image forming apparatus to execute the predetermined state transition of the image forming apparatus.

2. The image forming apparatus according to claim 1, further comprising a holding unit which holds the plurality of load conditions and the plurality of clusters of the configuration data to which the plurality of load conditions are associated, respectively.

3. The image forming apparatus according to claim 2, wherein the plurality of load conditions and the plurality of clusters of configuration data are downloaded when the image forming apparatus establishes first connection to the management apparatus.

4. The image forming apparatus according to claim 3, wherein the downloaded cluster of the configuration data is discarded after using the plurality of clusters of the configuration data or is overwritten on the corresponding cluster of configuration data held in the holding unit.

5. The image forming apparatus according to claim 1, wherein the cluster of configuration data which is received by the network communication device is identified using information indicating whether or not the cluster of configuration data has been notified to the image forming apparatus corresponding to the cluster of configuration data.

6. The image forming apparatus according to claim 1, wherein the network communication device does not receive a cluster of configuration data of the plurality of clusters of configuration data managed by the management apparatus, the cluster of configuration data being associated with the predetermined state transition and having been notified to the image forming apparatus.

7. The image forming apparatus according to claim 1, wherein the configuration data received by the network communication device differs depending on a type of occurred state transition.

8. The image forming apparatus according to claim 1, wherein a request for the cluster of configuration data from the image forming apparatus to the management apparatus includes at least a device identifier, and
wherein the network communication device receives a cluster of configuration data corresponding to the device identifier included in the request.

9. A processing method for an image forming apparatus, the method comprising:
requesting, if one of a plurality of load conditions is satisfied by the image forming apparatus, a cluster of configuration data from a management apparatus which manages configuration data of the image forming apparatus, the one of the plurality of load conditions being satisfied if a trigger of a predetermined state transition is occurred on the image forming apparatus;
receiving from the management apparatus a cluster of configuration data of a plurality of clusters of configuration data managed by the management apparatus is received, the received cluster of configuration data being associated with the predetermined state transition of which trigger is occurred; and
overwriting configuration data of the image forming apparatus with the cluster of received configuration data, wherein in the overwriting a corresponding cluster of configuration data of a plurality of clusters of configuration data of the image forming apparatus is updated by overwriting with the received cluster of the configuration data, the overwritten configuration data being used as configuration data of the image forming apparatus to execute the predetermined state transition of the image forming apparatus.

10. The processing method according to claim 9, wherein the cluster of configuration data which is received in the receiving is identified using information indicating whether or not the cluster of configuration data has been notified to the image forming apparatus corresponding to the cluster of configuration data.

11. A non-transitory computer-readable recording medium recording a program for controlling a computer to execute a processing method for an image forming apparatus, the processing method comprising:
requesting, if one of a plurality of load conditions is satisfied by the image forming apparatus, a cluster of configuration data from a management apparatus which manages configuration data of the image forming apparatus, the one of the plurality of load conditions being satisfied if a trigger of a predetermined state transition is occurred on the image forming apparatus;
receiving from the management apparatus a cluster of configuration data of a plurality of clusters of configuration data managed by the management apparatus is received, the received cluster of configuration data being associated with the predetermined state transition of which trigger is occurred; and
overwriting configuration data of the image forming apparatus with the cluster of received configuration data, wherein in the overwriting, a corresponding cluster of configuration data of a plurality of clusters of configuration data of the image forming apparatus is updated by overwriting with the received cluster of the configuration data, the overwritten configuration data being used as configuration data of the image forming apparatus to execute the predetermined state transition of the image forming apparatus.

* * * * *